US009222812B2

(12) United States Patent
Soreefan

(10) Patent No.: US 9,222,812 B2
(45) Date of Patent: Dec. 29, 2015

(54) HYBRID SENSOR SYSTEM FOR GAS FLOW MEASUREMENTS

(71) Applicant: Itron, Inc., Liberty Lake, WA (US)

(72) Inventor: Ibne Soreefan, Union, KY (US)

(73) Assignee: ITRON, INC., Liberty Lake, WA (US)

(*) Notice: Subject to any disclaimer, the term of this patent is extended or adjusted under 35 U.S.C. 154(b) by 466 days.

(21) Appl. No.: 13/663,819

(22) Filed: Oct. 30, 2012

(65) Prior Publication Data

US 2014/0118162 A1    May 1, 2014

(51) Int. Cl.

| G01F 7/00 | (2006.01) |
|---|---|
| G01F 1/32 | (2006.01) |
| G01F 1/56 | (2006.01) |
| G08C 19/00 | (2006.01) |
| G01F 15/02 | (2006.01) |
| G01F 15/04 | (2006.01) |
| G01F 15/06 | (2006.01) |
| G01F 1/684 | (2006.01) |
| G01D 4/00 | (2006.01) |

(52) U.S. Cl.
CPC ............... *G01F 1/3227* (2013.01); *G01F 1/56* (2013.01); *G01F 7/00* (2013.01); *G01F 15/028* (2013.01); *G01F 15/046* (2013.01); *G01F 15/063* (2013.01); *G08C 19/00* (2013.01); *G01D 4/002* (2013.01); *G01F 1/6842* (2013.01); *Y02B 90/241* (2013.01); *Y04S 20/32* (2013.01)

(58) Field of Classification Search
CPC ....... G01F 1/3227; G01F 1/6842; G01F 7/00; G01F 15/061
USPC ................ 73/861.19, 861.21, 861.22, 204.11
See application file for complete search history.

(56) References Cited

U.S. PATENT DOCUMENTS

| 3,640,133 | A | | 2/1972 | Adams | |
|---|---|---|---|---|---|
| 4,550,614 | A | * | 11/1985 | Herzl | 73/861.19 |
| 4,911,007 | A | | 3/1990 | Churchill et al. | |
| 5,003,810 | A | | 4/1991 | Jepson et al. | |
| 5,063,786 | A | * | 11/1991 | Sanderson et al. | 73/861.19 |
| 5,157,974 | A | | 10/1992 | Hattori et al. | |
| 5,218,872 | A | | 6/1993 | Hattori et al. | |

(Continued)

FOREIGN PATENT DOCUMENTS

JP    2003090746    3/2003

OTHER PUBLICATIONS

Furio Cascetta et al.; "The Future Domestic Gas Meter: Review of Current Developments", pp. 129-145, Apr. 1, 1994, Measurement, Institute of Measurement and Control, vol. 13, No. 2, London.

(Continued)

*Primary Examiner* — Lisa Caputo
*Assistant Examiner* — Jonathan Dunlap

(57) ABSTRACT

Disclosed are apparatus and methodology for measuring gas flow. A gas flow meter can include a plurality of sensors to detect a gas flow at various flow rates in the meter. A first sensor can detect a gas flow at a low flow rate and a second sensor can detect a gas flow when the flow rate is sufficient to produce an oscillating jet. The first sensor can be disposed parallel to the gas flow and detect the flow rate and the temperature of the gas flow. When the flow rate of the gas is below a predetermined threshold, power is supplied to the first sensor to detect gas flow. When the gas flow rate is high enough such that the gas flow produces an oscillating jet of fluid, power is supplied to the second sensor. The second sensor can detect the frequency of the oscillating jet flow.

33 Claims, 7 Drawing Sheets

(56) References Cited

U.S. PATENT DOCUMENTS

| | | | |
|---|---|---|---|
| 5,298,886 A | | 3/1994 | Ueki et al. |
| 5,309,770 A | | 5/1994 | Okabayashi |
| 5,339,695 A | | 8/1994 | Kang et al. |
| 5,684,472 A | | 11/1997 | Bane |
| 6,250,132 B1 * | 6/2001 | Drzewiecki | 73/23.2 |
| 6,321,790 B1 | | 11/2001 | Carver et al. |
| 6,860,157 B1 | | 3/2005 | Yang et al. |
| 6,895,069 B2 * | 5/2005 | Kim | 377/3 |
| 7,481,119 B2 | | 1/2009 | Yang et al. |
| 7,861,585 B2 * | 1/2011 | Muraoka et al. | 73/204.25 |
| 7,895,904 B2 * | 3/2011 | Matsubara et al. | 73/861.22 |
| 8,069,734 B2 * | 12/2011 | Oda et al. | 73/861.22 |
| 8,091,434 B2 * | 1/2012 | Vaidya | 73/861.19 |
| 8,334,787 B2 * | 12/2012 | Bushman et al. | 340/870.02 |
| 8,833,390 B2 * | 9/2014 | Ball et al. | 137/552 |
| 2004/0240602 A1 * | 12/2004 | Kim | 377/16 |
| 2004/0244498 A1 | | 12/2004 | Chen et al. |
| 2009/0153357 A1 * | 6/2009 | Bushman et al. | 340/870.02 |
| 2009/0241687 A1 * | 10/2009 | Matsubara et al. | 73/861.24 |
| 2009/0301219 A1 * | 12/2009 | Oda et al. | 73/861.22 |
| 2010/0223992 A1 * | 9/2010 | Muraoka et al. | 73/204.25 |
| 2011/0094308 A1 * | 4/2011 | Vaidya | 73/861.19 |
| 2012/0305084 A1 * | 12/2012 | Ball et al. | 137/1 |
| 2014/0260665 A1 * | 9/2014 | Soreefan et al. | 73/861.21 |

OTHER PUBLICATIONS

PCT International Search Report for PCT International Application No. PCT/US2013/051612 completed Jan. 28, 2014, mailed Feb. 10, 2014.

PCT Written Opinion of the International Searching Authority for PCT International Application No. PCT/US2013/051612, completed Jan. 28, 2014, mailed Feb. 10, 2014.

International Search Report and Written Opinion for International Application No. PCT/US2014/021909, mailed Jul. 14, 2014, 10 pages.

Non Final Office Action for U.S. Appl. No. 13/797,343, mailed Mar. 11, 2015, 9 pages.

Non Final Office Action for U.S. Appl. No. 13/797,343, mailed Sep. 24, 2014, 11 pages.

International Preliminary Report on Patentability for International Application No. PCT/US2013/051612, dated May 14, 2015, 8 pages.

Notice of Allowance for U.S. Appl. No. 13/797,343, dated Jun. 26, 2015, 6 pages.

* cited by examiner

HYBRID SENSOR SYSTEM FOR GAS FLOW MEASUREMENTS

FIELD OF THE SUBJECT MATTER

The presently disclosed subject matter relates generally to a gas flow measuring system, and more particularly, to a gas flow measuring system and corresponding or associated methodologies that improve accuracy of gas flow measurement in the system.

BACKGROUND OF THE SUBJECT MATTER

Gas meters are widely used in residential, commercial, and industrial settings to measure gas consumption. Regardless of quantity or quality of the gas, meters use the volume of the gas passing through the meter in the measurement. However, variables, such as temperature and pressure, can affect the gas flow through the meter and ultimately, the resulting measurement.

Conventionally, gas meters have often included a fluid oscillator sensor. In a meter having a fluid oscillator, gas is directed into a cavity through a nozzle. An obstacle is disposed opposite the output of the nozzle creating a two-dimensional fluid jet that oscillates, as well understood by those of ordinary skill in the art, transversely about a longitudinal axis when gas flows into the cavity at an adequate pressure (in other words, at a sufficient rate of flow). By detecting the frequency of the oscillation of the jet, a flow rate of the gas can be determined. However, when gas flows through the meter at a pressure less than the pressure needed to generate an oscillating jet, for example, such as only at a rate necessary to light a pilot light, such known metering apparatus cannot accurately measure the consumption.

In another conventional approach, a fluid oscillator can detect a greater range of gas flow rates using a single device that measures the frequency of an oscillating fluid jet and a temperature sensor that can be used to determine a flow rate. Such arrangement is generally only for residential settings and requires on-the-premises calibration. Because the composition and properties of gas differ from each source, significant time, complexity, and cost are utilized to calibrate each temperature sensor individually.

While various implementations of gas meter systems have been developed, and while various combinations of gas flow detection exist, no design has emerged that generally encompasses all of the desired characteristics as hereafter presented in accordance with the subject technology.

SUMMARY OF THE SUBJECT MATTER

In view of the recognized features encountered in the prior art and addressed by the presently disclosed subject matter, improved methodology and corresponding and/or associated apparatus and systems are provided for detecting gas flow in a gas meter system.

One exemplary embodiment of the presently disclosed subject matter relates to a method for measuring gas flow in a meter. Such an exemplary methodology may preferably comprise directing gas through the meter at various flow rates; detecting a gas flow of the gas with a first sensor when the gas is directed at a low flow rate; detecting an oscillation frequency of the gas with a second sensor when the gas is directed at a rate to produce an oscillating fluid jet of gas; and determining a flow rate based on outputs of at least one of such first sensor and such second sensor.

In some such exemplary embodiments, power may be supplied to the first sensor and the second sensor based on the flow rate. In some such methodologies, detecting a gas flow of the gas with a first sensor when the gas is directed at a low flow rate may comprise initiating power to the first sensor; detecting a voltage induced on the first sensor; and determining a flow rate when the gas is directed at the low flow rate based on the voltage induced on the first sensor; while detecting an oscillation frequency of the gas with a second sensor when the gas is directed at a rate to produce an oscillating fluid jet of gas may comprise initiating power to the second sensor, the second sensor comprising a first oscillating jet frequency sensor and a second oscillating jet frequency sensor; detecting the gas at the first oscillating jet frequency sensor; and detecting the gas at the second oscillating jet frequency sensor. In still further variations of such alternative embodiments, the first oscillating jet frequency sensor and the second oscillating jet frequency sensor may be disposed such that when the oscillating fluid jet of gas reaches a first extreme position, the oscillating fluid jet is only in communication with the first oscillating jet frequency sensor and when the oscillating fluid jet reaches a second extreme position, the oscillating fluid jet is only in communication with the second oscillating jet frequency sensor.

In further alternatives of the foregoing exemplary methodology, determining a flow rate based on an output of the first sensor and an output of the second sensor may comprise determining a velocity of gas flow when the gas is directed at the low flow rate and determining a frequency of oscillation of gas flow when the gas is directed at a rate to produce an oscillating fluid jet of gas.

In other alternatives, such exemplary methodology may further comprise detecting a temperature of the gas when the gas is directed at the low flow rate.

Per yet others, exemplary methodology may further comprise comparing the determined flow rate with a predetermined threshold. Per some such alternatives, such methodology may further comprise comparing the determined flow rate with a predetermined threshold; supplying power to the first sensor when the flow rate of the gas is below the predetermined threshold; discontinuing power to the first sensor when the flow rate of the gas exceeds the predetermined threshold; and supplying power to the second sensor when the flow rate of the gas exceeds the predetermined threshold.

In some presently disclosed alternatives, the first sensor and the second sensor may be different types of sensors.

It is to be understood by those of ordinary skill in the art that the presently disclosed subject matter equally relates to methodology and corresponding and/or associated devices and systems. One exemplary device comprises a gas flow meter. Such exemplary embodiment preferably comprises a gas flow passageway configured to direct gas through the meter; a gas measurement chamber; a nozzle in communication with such gas flow passageway, and configured to direct the gas into such gas measurement chamber; a first sensor disposed in such nozzle parallel to the gas flow, and configured to detect a gas flow at a low flow rate; an obstacle disposed in such gas measurement chamber, and configured to generate an oscillating fluid jet from a sufficient flow of gas; and a second sensor disposed in such gas measurement chamber, and configured to detect the oscillating fluid jet.

In alternatives of the foregoing exemplary meter embodiment, such first sensor may be further configured to detect a temperature of the gas and a voltage induced on a surface of such first sensor.

In other variations of presently disclosed meter embodiments, such second sensor may be disposed between such nozzle and such obstacle. In others thereof, such second sensor may comprise a first oscillating jet frequency sensor and a second oscillating jet frequency sensor disposed in such gas measurement chamber. In yet others thereof, such first and second oscillating jet frequency sensors may be respectively disposed such that when the oscillating fluid jet reaches a first extreme position, the oscillating fluid jet is only in communication with such first oscillating jet frequency sensor and when the oscillating fluid jet reaches a second extreme position, the oscillating fluid jet is only in communication with such second oscillating jet frequency sensor.

Still further variations of the foregoing may further comprise in combination with a meter a controller configured to determine a flow rate of the gas based on outputs of at least one of such first sensor and such second sensor; and a transmission element, associated with such controller and configured to transmit the flow rate determined by such controller.

Yet other presently disclosed variations may relate of meters wherein such first sensor may comprise a thermal flow sensor while such second sensor may comprise a piezo-film sensor.

Still further presently disclosed exemplary embodiments may relate to a utility meter coupled to a communication network. Such an arrangement preferably may comprise a power supply to supply power to the meter; a receiving element configured to receive information over the network; a transmitting element configured to transmit information over the network; a gas measurement chamber configured to direct gas flow through the meter, the gas measurement chamber comprising a nozzle, a first sensor disposed parallel to the gas flow and configured to detect gas flow at a low flow rate, an obstacle configured to direct gas into an oscillating fluid jet from a sufficient flow of gas, and a second sensor configured to detect the oscillating fluid jet; and a controller configured to determine a flow rate of the gas based on an output of the first sensor or an output of the second sensor.

In some variations of the foregoing, such power supply may supply power to such first sensor and such second sensor based on the flow rate. In others thereof, such controller may be further configured to initiate power to such first sensor, detect a voltage induced on such first sensor, and determine a flow rate when the gas is directed at the low flow rate as determined based on the voltage induced on such first sensor.

In alternative variations of the foregoing, such second sensor may comprise respective first and second oscillating jet frequency sensors, disposed such that when the oscillating fluid jet of gas reaches a first extreme position, the oscillating fluid jet is only in communication with such first oscillating jet frequency sensor and when the oscillating fluid jet reaches a second extreme position, the oscillating fluid jet is only in communication with such second oscillating jet frequency sensor. In other variations thereof, such controller may be further configured to initiate power to such first oscillating jet frequency sensor and such second oscillating jet frequency sensor, detect the gas at such first oscillating jet frequency sensor, and detect the gas at such second oscillating jet frequency sensor.

In other present variations, such controller may be further configured to determine a flow rate of the gas based on outputs of at least one of such first sensor and such second sensor, determine a velocity of the gas flow when the gas is directed at the low flow rate, and determine a frequency of oscillation of gas flow when the gas is directed at a sufficient rate to generate an oscillating fluid jet of gas.

In other presently disclosed embodiments thereof, such controller may be further configured to determine a temperature of the gas. In others thereof, the controller may be configured to compare the determined flow rate with a predetermined threshold.

In some alternatives of the foregoing, such controller may be configured to compare the determined flow rate with a predetermined threshold, to initiate power to such first sensor when the flow rate of the gas is below the predetermined threshold, to discontinue power to such first sensor when the flow rate of the gas exceeds the predetermined threshold, and to initiate power to such second sensor when the flow rate of the gas exceeds the predetermined threshold.

In various of the foregoing, such first and second sensors may comprise different types of sensors. For example, in some variations such first sensor may comprise a thermal flow sensor; and such second sensor may comprise a piezo-film sensor and/or be disposed between such nozzle and such obstacle.

Still further presently disclosed exemplary embodiments may relate to a utility metering communication network. Such an exemplary network may preferably comprise a first network device comprising transmitting and receiving elements, such first network device configured to act as a central database for the network; a plurality of end devices; and a second network device comprising transmitting and receiving elements, such second network device configured to act as a gateway between such first network device and at least one end device. In such foregoing exemplary network, preferably at least one end device may comprise a utility meter having transmitting elements and receiving elements configured to communicate over the network; a flow passageway configured to direct fluid through such meter; a measurement chamber; a nozzle in communication with such flow passageway, and configured to direct the fluid into such measurement chamber; a first sensor disposed in the nozzle parallel to the fluid flow, the first sensor configured to detect a fluid flow at a low flow rate; an obstacle disposed in such measurement chamber, and configured to generate an oscillating fluid jet from a sufficient flow of fluid; a second sensor disposed in such measurement chamber, and configured to detect the oscillating fluid jet; and a controller configured to determine a flow rate of the fluid based on outputs of at least one of such first sensor and such second sensor.

Variations of the foregoing may in some instances further configure such controller for communicating the determined flow rate with either of such first network device or such second network device. In yet others thereof, such controller may be further configured to initiate power to such first sensor, detect a voltage induced on such first sensor, and determine a flow rate when the fluid is directed at the low flow rate determined based on the voltage induced on such first sensor. In still others thereof, such controller may be further configured to compare the flow rate with a predetermined threshold and to initiate power to such second sensor when the flow rate exceeds the predetermined threshold.

Additional embodiments of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Figure 1:
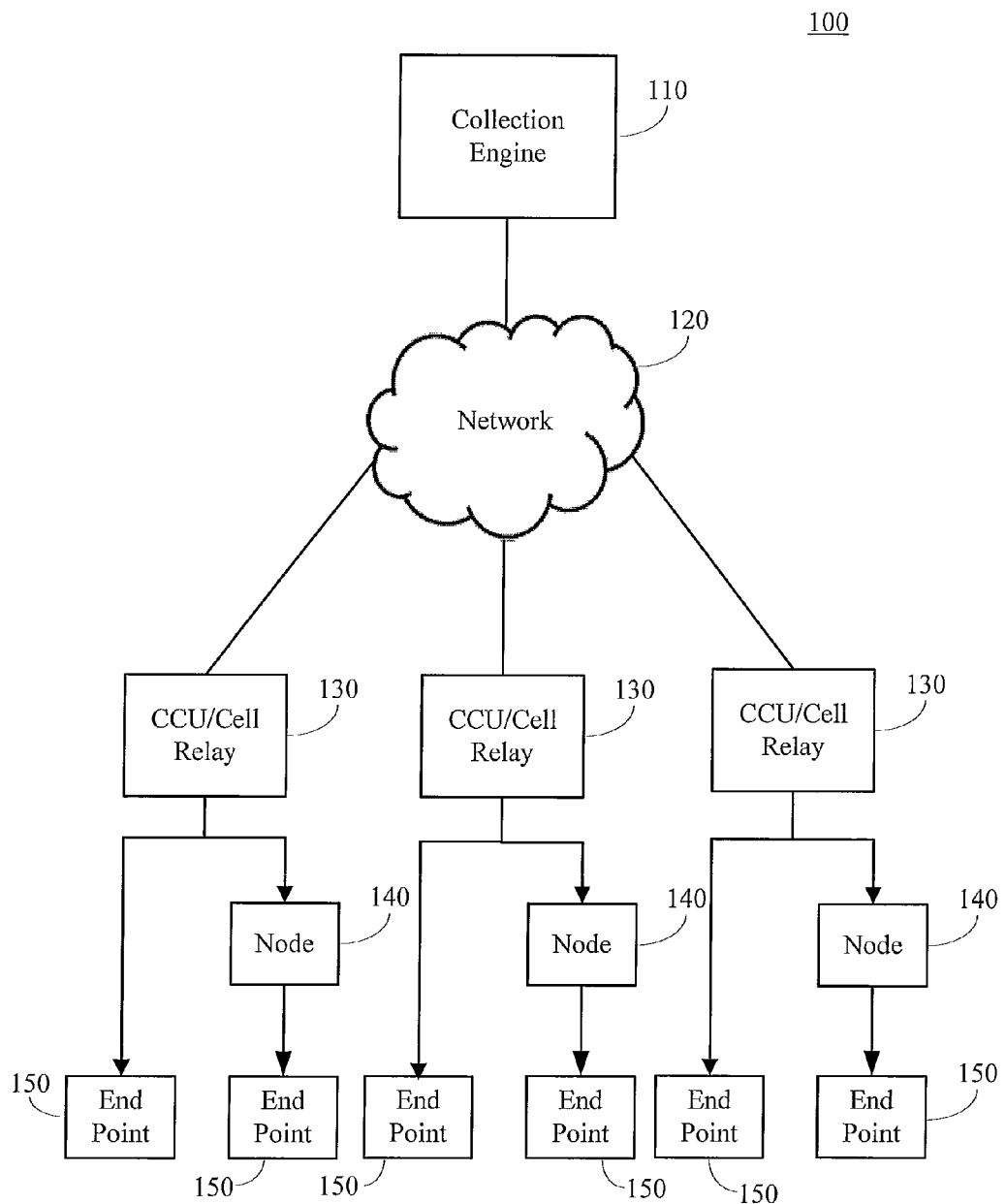
FIG. 1 depicts an exemplary communication network system according to an exemplary embodiment of the present disclosure.

Repeat use of reference characters throughout the present specification and appended drawings is intended to represent same or analogous features, elements, or steps.

DETAILED DESCRIPTION OF THE SUBJECT MATTER

As discussed in the Summary of the Subject Matter section, the presently disclosed subject matter is particularly concerned with improved gas flow measurement accuracy in a gas flow measuring system.

Selected combinations of aspects of the disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Generally, the present disclosure is directed to improved system/device and method subject matter for measuring gas flow. A gas flow meter can include a plurality of sensors to detect a gas flow otherwise occurring at various flow rates in the meter. A first sensor can detect a gas flow at a low flow rate and a second sensor can detect an oscillating gas flow when the flow rate is sufficient to produce an oscillating jet. The first sensor can be disposed parallel to the gas flow and detect the flow rate and the temperature of the gas flow. When the flow rate of the gas is below a predetermined threshold, power is supplied to the first sensor to detect gas flow at such low flow rate. When the gas flow rate is high enough such that the gas flow produces or generates an oscillating jet of fluid, power is supplied to the second sensor. The second sensor can include a plurality of sensors to detect the frequency of the oscillating jet flow. In addition, the first and second sensors can be different types of sensors.

Referring now to the drawings, FIG. 1 illustrates an exemplary communication network system according to an exemplary embodiment of the present disclosure. The network system can be, for example, a bi-directional communication network system generally 100 that can include a collection engine 110, a network 120, cell control units (CCUs) or cell relays 130, nodes 140, and endpoints 150.

The collection engine 110 can act as a central database that knows all the addresses of each element of the network as well as saving the information provided from all the elements of the network. Information transmission or requests can be initiated by or at the collection engine 110 or by any element in the network. In a metrology network, collection engine 110 can be located at a utility premises and can be a single device or a plurality of devices coupled together. It can collect meter readings from one or more of the endpoints to monitor and manage utility usage as well as to compile bills based on the usage.

Network 120 connects the collection engine with the rest of the network. The network 120 can correspond to any type of communication connection, now or later known, such as wireless, internet, Ethernet, fiber optics, or the like. A protocol can be used in network 120 to communicate information.

CCUs or cell relays 130 can act as gateways or junctions between the nodes 140 and endpoints 150 of the network and the collection engine 110. Network devices can be arranged in cells and the CCU/cell relay 130 can include the addresses of each device in the respective cell in a routing table, or other arrangements may be provided. CCU/cell relay 130 can transmit information in two directions, upstream to the collection engine 110 and/or downstream to the nodes 140 and endpoints 150. Upstream packets can include, for example, an uplink message, a broken link message, and/or an outage notification while downstream packets can include, for example, a downlink message and a broadcast message. In a metrology network, the CCU/cell relay 130 can initiate communications with endpoints 150 to collect meter readings, or to communicate when a broken link has occurred and a new communication path needs to be determined.

In a metrology network, endpoints 150 can be meter reading devices (electricity, gas, water, or the like) to transmit and/or to receive metering information. Nodes 140 can also be meter reading devices and/or they can be network devices that enhance communications, such as a repeater or a meter reading device with repeater capabilities. While only a few representative endpoints are illustrated in FIG. 1, there can be as many endpoints and nodes as necessary to communicate within the network. In addition, a plurality of endpoints and nodes can be variously coupled to form a communication path to the CCU/cell relay 130. The number and connection paths are not intended to be limited by the representative illustration in FIG. 1.

Figure 2:
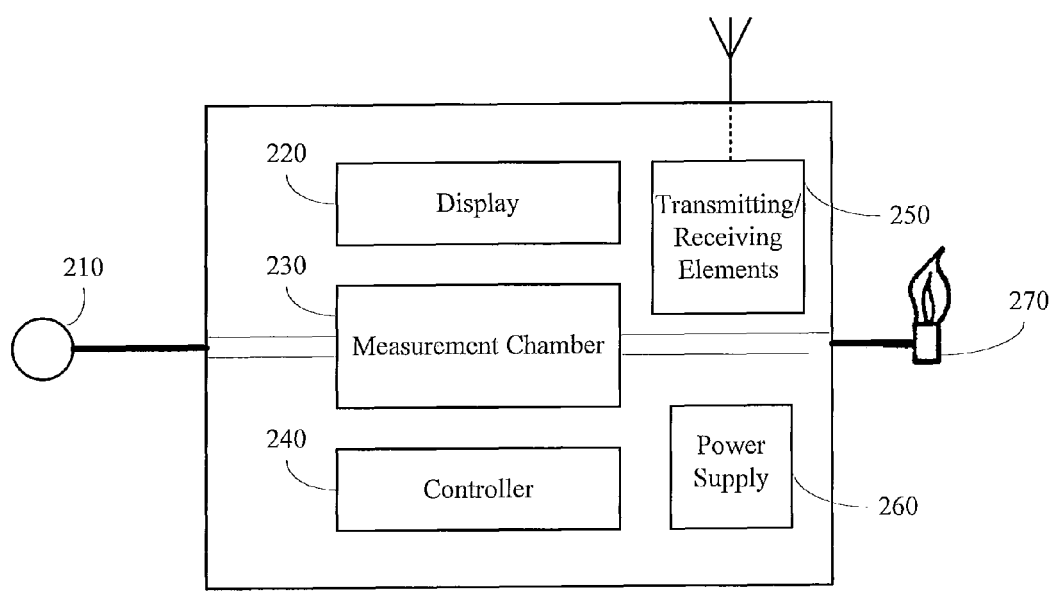
FIG. 2 depicts an exemplary utility meter configuration according to an exemplary embodiment of the present disclosure.

FIG. 2 depicts an exemplary utility meter configuration according to an exemplary embodiment of the present disclosure. The utility meter generally 200 can include a display 220, a measurement chamber 230, a controller 240, transmitting and/or receiving elements 250, and power supply 260.

Display 220 can provide visual information to display to a user (or record keeper). The display 220 can be a digital display or an electro-mechanical display. The visual information can include various characters and/or symbols. For instance, time and date can be displayed on display 220. Alternatively, current usage values may also be displayed to a user on display 220.

A source 210 is coupled with meter 200 to provide a commodity for measurement. For instance, a fluid source such as gas or water can be coupled with the meter to measure a commodity supplied to the premises. The commodity passes through measurement chamber 230 to the commodity usage access point 270 of the associated premises. For instance, when source 210 is a gas source, usage access point 270 can be a pilot light as represented in FIG. 2 (not labeled).

As the fluid passes through the measurement chamber 230, a flow rate can be determined in order to calculate usage of the commodity. The controller 240 can use the flow rate information to calculate commodity usage. Alternatively, controller 240 can save flow rate information and transmit the flow rate information using the transmitting elements 250 to supply the information over the network to a collection engine.

The meter 200 can also include a power supply 260 to provide power to any or all elements of the meter. The power supply 260 can be a battery or a connection to an external power source. For example, power supply 260 can provide power to the display 220, any elements in the measurement chamber 230, the controller 240, and/or the transmitting/receiving elements 250.

Transmitting/receiving elements 250 can include any elements necessary to transmit information over the network. For instance, transmitting/receiving elements 250 can include an antenna (represented but not labeled in FIG. 2). An antenna can be disposed internally within the meter housing, embedded in the housing itself, or can be disposed externally to the meter and otherwise coupled to the transmitting/receiving elements 250.

A given meter 200 can be used in a wide variety of applications including residential, commercial, and/or industrial settings. The flow rates for each setting are vastly different. For example, in residential settings, flow rates may generally be approximately 0.125 to 500 cubic feet per hour (CFH), while in commercial settings the flow rates may typically be approximately 1.5 to 1100 CFH, and while in industrial settings the flow rates may be approximately 1 to 4200 CFH. The sensing elements of meter 200 may generally be the same for all such applications. Such arrangement allows for a single flow rate detection configuration to be used in a wide range of applications.

Due to the unique makeup of the gas mixture in each environment, calibration can be performed at the premises to improve flow rate determination. Each gas mixture includes different combinations of properties that can affect the flow rate. Accordingly, after meter 200 is installed at the premises, a calibration method can be performed in order to determine the unique gas mixture for the specific environment at the premises. Such information can be advantageously stored in the controller 240 and used to determine flow rate at a particular installation.

Figure 3:
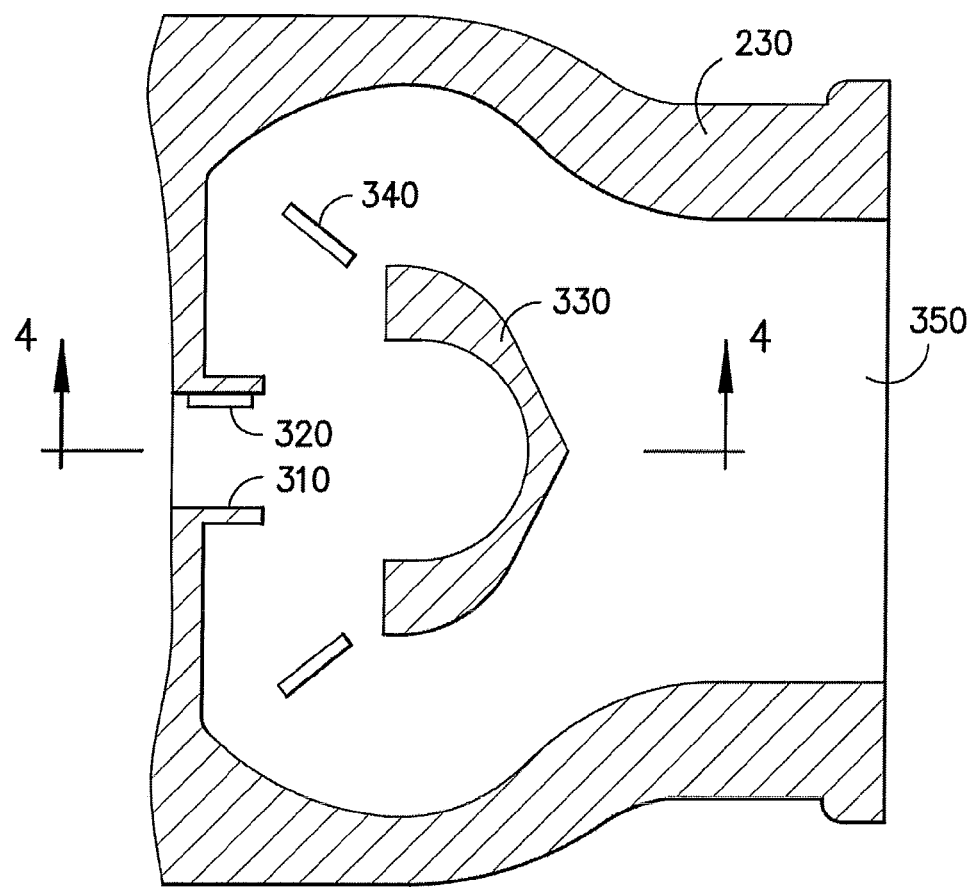
FIG. 3 depicts a cross-sectional view of an exemplary measurement chamber of a utility meter according to an exemplary embodiment of the present disclosure.
Figure 4:
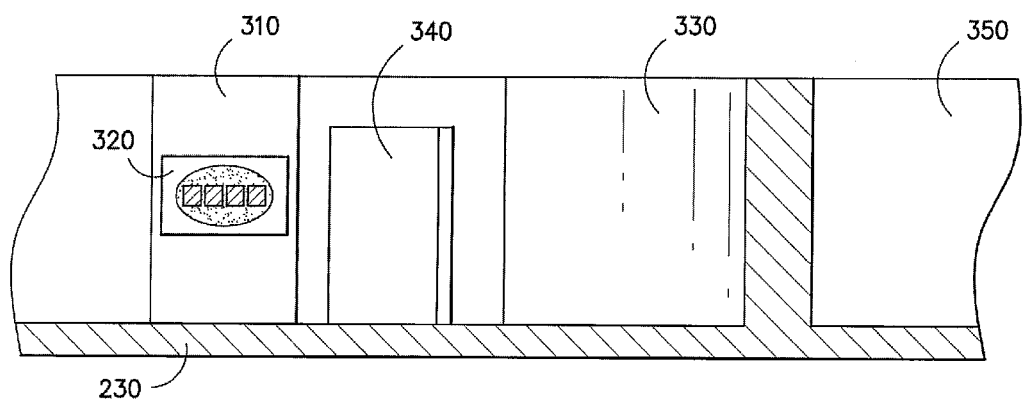
FIG. 4 depicts a cross-sectional view of an exemplary measurement chamber of a utility meter according to an exemplary embodiment of the present disclosure, taken along a section line 4-4 as illustrated in present FIG. 3.

FIGS. 3 and 4 depict cross-sections of an exemplary measurement chamber generally 230 according to an exemplary embodiment of the present disclosure. The measurement chamber 230 can include a nozzle 310, a low flow rate sensor 320, an obstruction 330, a pair (respective first and second) of oscillating fluid jet sensors 340, and an outlet 350.

Fluid enters measurement chamber 230 from a source through a nozzle 310. Measurement chamber 230 can be a fluidic oscillator and can have any shape, arrangement, and or configuration such that an oscillating fluid jet can be generated when the fluid enters the chamber at certain flow rates (those sufficient for a given chamber design to generate such oscillation). The fluid can pass into the measurement chamber 230 at various flow rates. In an exemplary system, a low flow rate can be associated with a rate used to maintain a flame at the pilot light. A medium flow rate, for example, can be associated with hot water heater use, while a high or maximum flow rate can be associated with a maximum usage demand on the premises.

When a fluid such as gas is introduced into the chamber 230 at a low flow rate, there is not sufficient (that is not enough) pressure (flow of gas) to generate an oscillating jet flow. In accordance with the presently disclosed subject matter, in order to detect the flow rate of the gas at a low flow rate, a low flow rate sensor 320 is disposed parallel to the gas flow in the nozzle 310. The low flow rate sensor 320 can be a thermal flow sensor and include sensing elements that can detect the temperature of the gas and the velocity of the gas. For instance, to determine the flow rate of the gas, the flow rate sensor 320 can detect a velocity in the gas based on a change in voltage over the surface of the sensor 320.

Gas can be measured in cubic feet per hour (CFH) with the density of the gas correlated to the temperature of the gas. When the gas is at a lower temperature, the gas is denser than at higher temperatures, which means that more gas can occupy the same volume at lower temperatures. In order to improve consumption calculations, the temperature of the gas can be used to determine a flow rate. For instance, a change in resistance value can be detected at sensor 320. The change in resistance can be indicative of the temperature of the fluid flowing through the meter. Such value then can be used to select an algorithm, equation, model, and/or look-up table to be used in calculating the flow rate.

When the fluid is introduced into the chamber 230 at a rate high enough (sufficient) to generate an oscillating jet flow, the fluid sweeps over the surface of the obstacle 330 during oscillation and the frequency of oscillation is detected by oscillating fluid jet sensors 340. The obstacle 330 can have any shape, arrangement, or configuration such that an oscillating jet is produced when the fluid jet (under sufficient pressure or rate of flow) strikes the obstruction.

Oscillating fluid jet sensors 340 can be, for example, piezo-film sensors. As the oscillating jet flow oscillates from one extreme position to another, the voltage on the sensor changes. The oscillating fluid jet sensors 340 can detect the oscillating frequency of the oscillating fluid jet because as the jet comes into contact with the sensor, the voltage on the sensor changes, creating an output signal indicative of the frequency. For instance, in accordance with presently disclosed subject matter, when the oscillating jet flow is in a first extreme position, the oscillating jet flow contacts a first oscillating fluid jet sensor such that the oscillating jet flow is only in communication with the first oscillating fluid jet sensor. Similarly, when the fluid jet oscillates to a second extreme position, the oscillating jet flow only contacts the second oscillating fluid jet sensor.

The output signals of oscillating fluid jet sensors 340 can be processed using various techniques. For instance, the output signal can be filtered and/or amplified. The amount of processing, such as amplification, can correlate to the flow rate. For instance the higher the flow rate, the less amplification used, while the lower the flow rate, the more amplification used.

Figure 5:
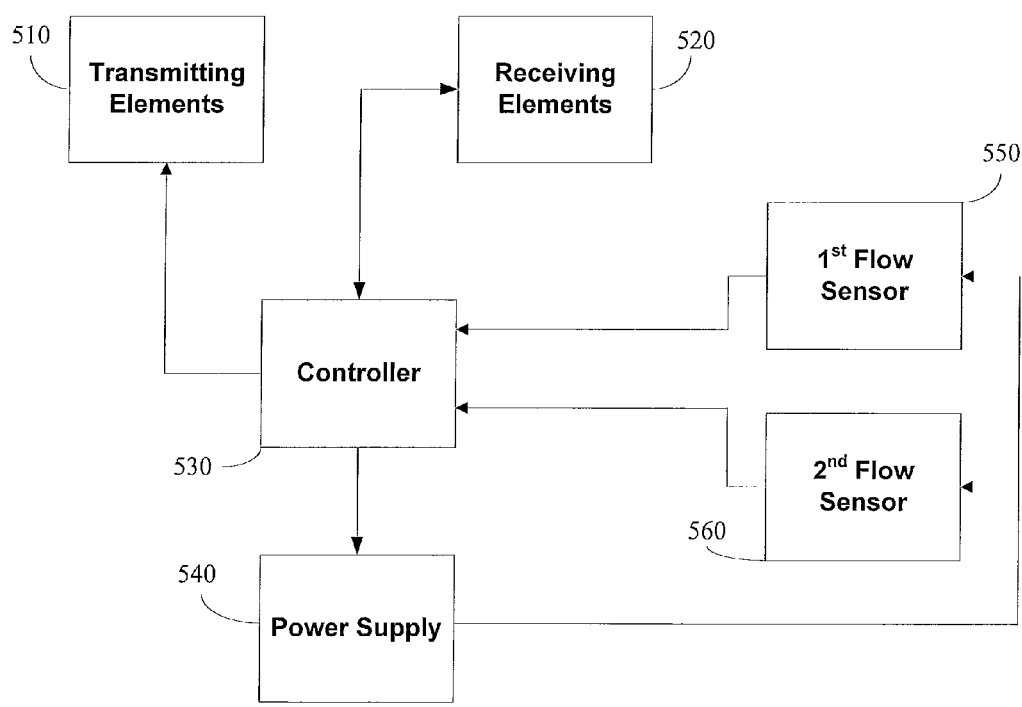
FIG. 5 depicts a block diagram of an exemplary measurement control system according to an exemplary embodiment of the present disclosure.

FIG. 5 depicts a block diagram of an exemplary measurement control system generally 500 according to an exemplary embodiment of the present disclosure. The measurement control system 500 can include transmitting elements 510, receiving elements 520, controller 530, power supply 540, a designated first flow sensor 550, and a designated second flow sensor 560.

Controller 530 can include a memory and one or more processing devices such as microprocessors, CPUs or the like, such as general or special purpose microprocessors operable to execute programming instructions or micro-control code associated with commodity measurement and transmission of such information over a network. The memory can represent random access memory such as DRAM, or read only memory such as ROM or FLASH. In one exemplary embodiment, the processor may execute programming instructions stored in memory. The memory can be a separate component from the processor or can be included onboard within the processor. Alternatively, the controller might also be constructed without using a microprocessor, using a combination of discrete analog and/or digital logic circuitry (such as amplifiers, integrators, comparators, flip-flops, AND gates, and the like) to perform control functionality instead of relying upon software. In other embodiments, various hybrids of hard-wired functionality versus software-driven implementations may be practiced, as will be understood by those of ordinary skill in the art without requiring further discussion of such details.

The representative controller 530 can be coupled with the first flow sensor 550 and the second flow sensor 560. As the fluid enters the measurement chamber at a low flow rate, the controller 530 can initiate power to the first flow sensor 550 from power supply 540. Controller 530 monitors the output of the first flow sensor 550 to determine the flow rate at which the fluid is passing through the chamber.

The flow rate can be determined using a detected temperature of the gas, a detected velocity of the gas, and/or a detected frequency of the gas. The detected temperature, velocity, and/or frequency can be applied to an algorithm, equation, model, and/or look up table to determine the flow rate, details of which form no particular aspect of the presently disclosed subject matter.

The determined flow rate can be compared with a predetermined threshold. For instance, the predetermined threshold can be a fraction of the maximum flow rate such as $\frac{1}{10}$ of the maximum flow rate. The predetermined threshold can be a single value or a range of values. First flow sensor 550 and second flow sensor 560 can have an overlapping flow rate detection range. The predetermined threshold can be selected to be between the overlapping flow rate detection ranges.

When the detected flow rate is below the predetermined threshold, the controller 530 can control the power supply 540 to supply power to the first flow sensor 550. When the detected flow rate exceeds the predetermined threshold, the controller 530 can control the power supply 540 to discontinue power to the first flow sensor 550 and to supply power to the second flow sensor 560.

The controller 530 can determine a flow rate based on the outputs of at least one of the first flow sensor 550 and the second flow sensor 560. The flow rate can be determined based on each output or the outputs can be considered together to determine an overall flow rate.

The flow rate can be indicative of the amount of commodity use by the premises. For instance, the flow rate can be used to determine the amount of gas used in $ft^3$/hour (CFH).

After the flow rate is determined, such information can be transmitted over the network using transmitting elements 510. The flow rate can be compiled for billing purposes at the meter or the flow rate can be transmitted to a central database to compile billing information.

Figure 6:
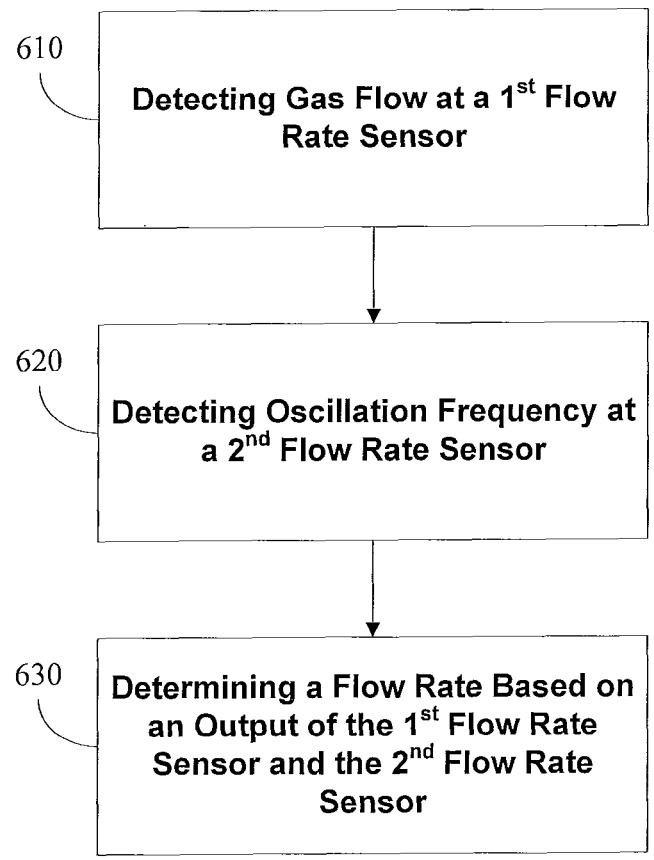
FIG. 6 depicts a flow chart of an exemplary method of detecting usage according to an exemplary embodiment of the present disclosure.
Figure 7:
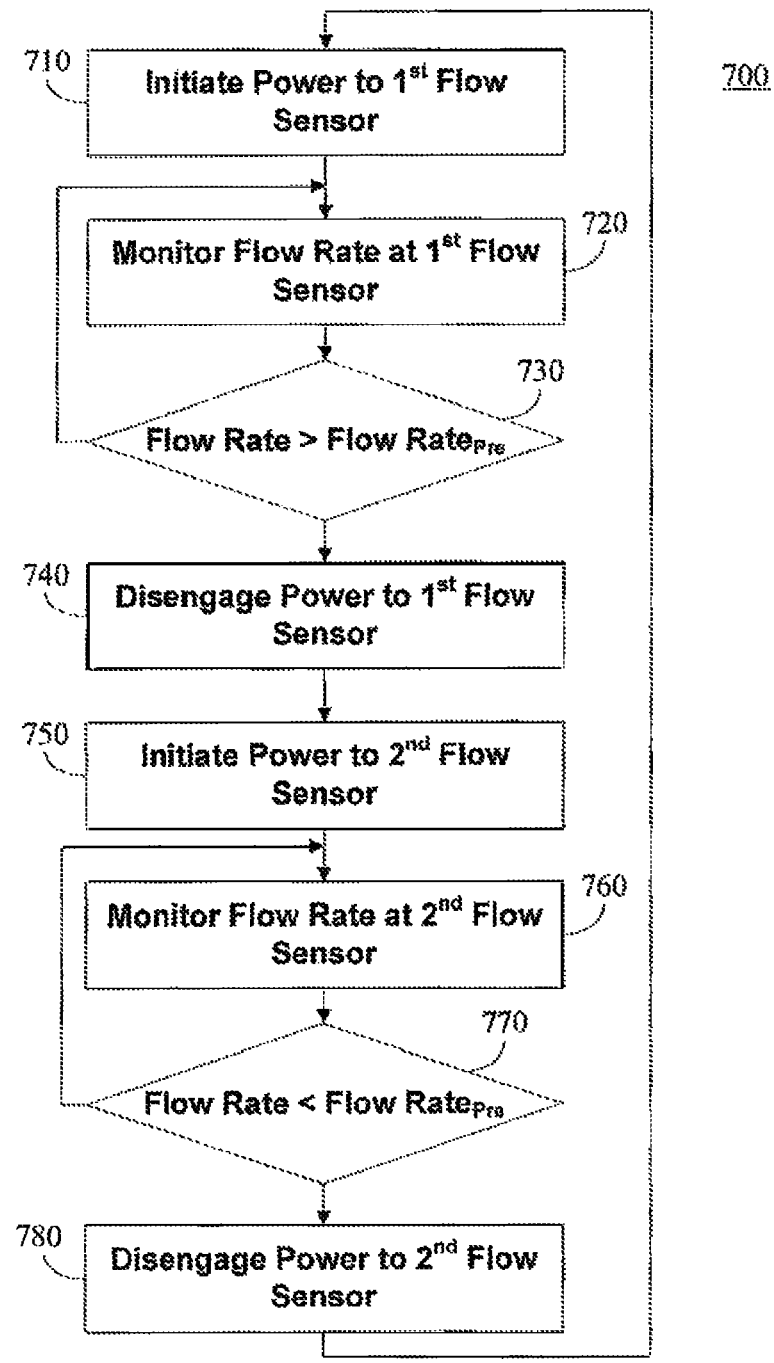
FIG. 7 depicts a flow chart of an exemplary method of detecting usage according to an exemplary embodiment of the present disclosure.

FIGS. 6 and 7 depict respective flow charts of exemplary methods generally 600 and 700 according to exemplary embodiments of the present disclosure. The methods 600 and 700 can be implemented with any suitable system including a fluid or commodity measurement device. In addition, although FIGS. 6 and 7 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

FIG. 6 depicts a flow chart associated with a method generally 600 of detecting a flow rate. At step 610, gas flow can be detected at a first flow rate sensor. When the gas flow achieves a pressure high enough (in other words, sufficient) to generate an oscillating fluid jet, the oscillation frequency can be detected at the second flow rate sensor in step 620. Those of ordinary skill in the art will understand that the precise pressure or rate of flow necessary to achieve such oscillation will depend at least in part on the arrangement of the overall measurement chamber and related physicality of cooperating components thereof. The output of the first flow rate sensor or of the second flow rate sensor can be used to determine the flow rate at step 630.

FIG. 7 depicts a flow chart associated with another presently disclosed exemplary method generally 700 of detecting a flow rate. At step 710, power is initiated to the first flow sensor. The flow rate is monitored at the first flow rate sensor in step 720, and the flow rate is compared to a predetermined threshold in step 730. When the flow rate exceeds the predetermined threshold, power to the first flow sensor is disengaged per step 740, and power is initiated at the second flow sensor per step 750. The flow rate is monitored at the second flow rate sensor per step 760, and the flow rate is compared to the predetermined threshold per step 770. When the flow rate monitored at the second flow rate sensor is less than the predetermined threshold, power to the second flow sensor is disengaged per step 780.

According to aspects of the present disclosure, a meter having a single flow rate detection configuration can be used in a wide range of applications including residential, commercial, and industrial settings. The precision of flow rates, and thus consumption measurements, can be improved by using a low flow rate sensor and an oscillating jet frequency sensor together, for a hybrid combination. By positioning the low flow rate sensor parallel to the fluid flow, the accuracy of the velocity of the fluidic flow can be improved without impeding the gas flow. Power usage in the meter can be reduced by powering sensors based on the flow rate. Due to the improved accuracy of a low flow rate detection, detection of slow leaks or other problems can be more readily detected within the system, once unexpected consumption values are determined based on the flow rates.

While the presently disclosed subject matter has been described in detail with respect to specific embodiments thereof, it will be appreciated that those skilled in the art, upon attaining an understanding of the foregoing may readily produce alterations to, variations of, and/or equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. A method for measuring gas flow in a meter, comprising:
   directing gas through the meter at various flow rates;
   detecting a gas flow of the gas with a first sensor when the gas is directed at a low flow rate;
   detecting an oscillation frequency of the gas with a second sensor when the gas is directed at a rate to produce an oscillating fluid jet of gas;
   determining a flow rate based on outputs of at least one of the first sensor and the second sensor; and
   changing supply of power to the first sensor and the second sensor based on the flow rate.

2. A method as in claim 1, wherein:
   detecting a gas flow of the gas with a first sensor when the gas is directed at a low flow rate comprises:
      initiating power to the first sensor;
      detecting a voltage induced on the first sensor; and
      determining a flow rate when the gas is directed at the low flow rate based on the voltage induced on the first sensor; and
   detecting an oscillation frequency of the gas with a second sensor when the gas is directed at a rate to produce an oscillating fluid jet of gas comprises:
      initiating power to the second sensor, the second sensor comprising a first oscillating jet frequency sensor and a second oscillating jet frequency sensor;
      detecting the gas at the first oscillating jet frequency sensor; and
      detecting the gas at the second oscillating jet frequency sensor.

3. A method as in claim 2, wherein the first oscillating jet frequency sensor and the second oscillating jet frequency sensor are disposed such that when the oscillating fluid jet of gas reaches a first extreme position, the oscillating fluid jet is only in communication with the first oscillating jet frequency sensor and when the oscillating fluid jet reaches a second extreme position, the oscillating fluid jet is only in communication with the second oscillating jet frequency sensor.

4. A method as in claim 1, wherein determining a flow rate based on outputs of at least one of the first sensor and the second sensor comprises determining a velocity of gas flow when the gas is directed at the low flow rate and determining a frequency of oscillation of gas flow when the gas is directed at a rate to produce an oscillating fluid jet of gas.

5. A method as in claim 1, further comprising detecting a temperature of the gas when the gas is directed at the low flow rate.

6. A method as in claim 1, further comprising comparing the determined flow rate with a predetermined threshold.

7. A method as in claim 1, further comprising:
   comparing the determined flow rate with a predetermined threshold; and
   wherein
      power is supplied to the first sensor when the flow rate of the gas is below the predetermined threshold;
      power to the first sensor is discontinued when the flow rate of the gas exceeds the predetermined threshold; and
      power is supplied to the second sensor when the flow rate of the gas exceeds the predetermined threshold.

8. A method as in claim 1, wherein the first sensor and the second sensor are different types of sensors.

9. A gas flow meter, comprising:
   a gas flow passageway configured to direct gas through the meter;
   a gas measurement chamber;
   a nozzle in communication with said gas flow passageway, and configured to direct the gas into said gas measurement chamber;
   a first sensor disposed in said nozzle parallel to the gas flow, and configured to detect a gas flow at a low flow rate;
   an obstacle disposed in said gas measurement chamber, and configured to generate an oscillating fluid jet from a sufficient flow of gas;
   a second sensor disposed in said gas measurement chamber, and configured to detect the oscillating fluid jet;
   a controller configured to determine a flow rate of the gas based on outputs of at least one of said first sensor and said second sensor; and
   a power supply,
   wherein the controller is configured to direct the power supply to change supply of power to the first sensor and the second sensor based on the flow rate.

10. A meter as in claim 9, wherein said first sensor is further configured to detect a temperature of the gas and a voltage induced on a surface of said first sensor.

11. A meter as in claim 9, wherein said second sensor is disposed between said nozzle and said obstacle.

12. A meter as in claim 11, wherein said second sensor comprises a first oscillating jet frequency sensor and a second oscillating jet frequency sensor disposed in said gas measurement chamber.

13. A meter as in claim 12, wherein said first and second oscillating jet frequency sensors are respectively disposed such that when the oscillating fluid jet reaches a first extreme position, the oscillating fluid jet is only in communication with said first oscillating jet frequency sensor and when the oscillating fluid jet reaches a second extreme position, the oscillating fluid jet is only in communication with said second oscillating jet frequency sensor.

14. A meter as in claim 9, further comprising:
   a transmission element, associated with said controller and configured to transmit the flow rate determined by said controller.

15. A meter as in claim 9, wherein said first sensor comprises a thermal flow sensor.

16. A meter as in claim 9, wherein said second sensor comprises a piezo-film sensor.

17. The gas flow meter of claim 9, wherein the obstacle has a U shape with its opening positioned toward the nozzle, and wherein the second sensor includes at least two second sensors each positioned near a respective end of the U-shaped obstacle.

18. A utility meter coupled to a communication network, comprising:
   a power supply to supply power to the meter;
   a receiving element configured to receive information over the network;
   a transmitting element configured to transmit information over the network;
   a gas measurement chamber configured to direct gas flow through the meter, the gas measurement chamber comprising a nozzle, a first sensor disposed parallel to the gas flow and configured to detect gas flow at a low flow rate, an obstacle configured to direct gas into an oscillating fluid jet from a sufficient flow of gas, and a second sensor configured to detect the oscillating fluid jet; and a controller configured to determine a flow rate of the gas based on at least one of outputs of the first sensor and the second sensor, and to direct the power supply to change supply of power to the first sensor and the second sensor based on the flow rate.

19. A utility meter as in claim 18, wherein said controller is further configured to initiate power to said first sensor, detect a voltage induced on said first sensor, and determine a flow rate when the gas is directed at the low flow rate as determined based on the voltage induced on said first sensor.

20. A utility meter as in claim 19, wherein said second sensor comprises respective first and second oscillating jet frequency sensors, disposed such that when the oscillating fluid jet of gas reaches a first extreme position, the oscillating fluid jet is only in communication with said first oscillating jet frequency sensor and when the oscillating fluid jet reaches a second extreme position, the oscillating fluid jet is only in communication with said second oscillating jet frequency sensor.

21. A utility meter as in claim 20, wherein said controller is further configured to initiate power to said first oscillating jet frequency sensor and said second oscillating jet frequency sensor, detect the gas at said first oscillating jet frequency sensor, and detect the gas at said second oscillating jet frequency sensor.

22. A utility meter as in claim 18, wherein said controller is further configured to determine a flow rate of the gas based on outputs of at least one of said first sensor and said second sensor, determine a velocity of the gas flow when the gas is directed at the low flow rate, and determine a frequency of oscillation of gas flow when the gas is directed at a sufficient rate to generate an oscillating fluid jet of gas.

23. A utility meter as in claim 18, wherein said controller is further configured to determine a temperature of the gas.

24. A utility meter as in claim 18, wherein the controller is configured to compare the determined flow rate with a predetermined threshold.

25. A utility meter as in claim 18, wherein said controller is configured to compare the determined flow rate with a predetermined threshold, to initiate power to said first sensor when the flow rate of the gas is below the predetermined threshold, to discontinue power to said first sensor when the flow rate of the gas exceeds the predetermined threshold, and to initiate power to said second sensor when the flow rate of the gas exceeds the predetermined threshold.

26. A utility meter as in claim 18, wherein said first and second sensors comprise different types of sensors.

27. A utility meter as in claim 26, wherein:
said first sensor comprises a thermal flow sensor; and
said second sensor comprises a piezo-film sensor.

28. A utility meter as in claim 18, wherein said second sensor is disposed between said nozzle and said obstacle.

29. The utility meter of claim 18, wherein the obstacle has a U shape with its opening positioned toward the nozzle, and wherein the second sensor includes at least two second sensors each positioned near a respective end of the U-shaped obstacle.

30. A utility metering communication network, comprising:
a first network device comprising transmitting and receiving elements, said first network device configured to act as a central database for the network;
a plurality of end devices; and
a second network device comprising transmitting and receiving elements, said second network device configured to act as a gateway between said first network device and at least one end device;
wherein at least one end device comprises a utility meter having:
transmitting elements and receiving elements configured to communicate over the network;
a flow passageway configured to direct fluid through said meter;
a measurement chamber;
a nozzle in communication with said flow passageway, and configured to direct the fluid into said measurement chamber;
a first sensor disposed in the nozzle parallel to the fluid flow, the first sensor configured to detect a fluid flow at a low flow rate;
an obstacle disposed in said measurement chamber, and configured to generate an oscillating fluid jet from a sufficient flow of fluid;
a second sensor disposed in said measurement chamber, and configured to detect the oscillating fluid jet;
a power supply; and
a controller configured to determine a flow rate of the fluid based on outputs of at least one of said first sensor and said second sensor, and to direct the power supply to change supply of power to the first sensor and the second sensor based on the flow rate.

31. A network as in claim 30, wherein said controller is further configured for communicating the determined flow rate with either of said first network device or said second network device.

32. A network as in claim 30, wherein said controller is further configured to initiate power to said first sensor, detect a voltage induced on said first sensor, and determine a flow rate when the fluid is directed at the low flow rate determined based on the voltage induced on said first sensor.

33. A network as in claim 30, wherein said controller is further configured to compare the flow rate with a predetermined threshold and to initiate power to said second sensor when the flow rate exceeds the predetermined threshold.

* * * * *